United States Patent [19]

Sage et al.

[11] Patent Number: 5,781,582
[45] Date of Patent: Jul. 14, 1998

[54] FREQUENCY AGILE TRANSCEIVER WITH MULTIPLE FREQUENCY SYNTHESIZERS PER TRANSCEIVER

[75] Inventors: Gerald F. Sage, Mountain View; Gurbux S. Msutta, San Jose, both of Calif.

[73] Assignee: InterWAVE Communications International Ltd., Hamilton, Bermuda

[21] Appl. No.: 434,597

[22] Filed: May 4, 1995

[51] Int. Cl.$^6$ .............. H04K 1/04; H04L 27/26; H04B 1/38
[52] U.S. Cl. .............. 375/202; 375/222; 375/376; 340/825.74; 379/59; 370/330; 380/34; 455/422
[58] Field of Search .............. 375/202, 200, 375/344, 356, 375, 219, 376; 455/33.1, 49.1, 33.4, 50.1, 51.1, 53.1, 54.1, 57.1, 87, 422; 380/33, 21, 48, 49; 395/200.19; 364/232.2, 232.9; 379/58, 59, 62; 340/825.14, 825.2, 825.5, 825.73, 825.74; 370/297, 330

[56] References Cited

U.S. PATENT DOCUMENTS

| | | | |
|---|---|---|---|
| 4,144,409 | 3/1979 | Utano et al. | 379/60 |
| 4,777,633 | 10/1988 | Fletcher | 370/50 |
| 4,785,450 | 11/1988 | Bolgiano et al. | 374/95.1 |
| 4,825,448 | 4/1989 | Critchlow et al. | 375/222 |
| 5,224,121 | 6/1993 | Schorman | 375/1 |
| 5,263,047 | 11/1993 | Kotzin et al. | 375/202 |
| 5,287,384 | 2/1994 | Avery et al. | 375/202 |
| 5,303,234 | 4/1994 | Kou | 370/85.2 |
| 5,448,569 | 9/1995 | Huang et al. | 370/95.1 |
| 5,483,557 | 1/1996 | Webb | 375/349 |
| 5,541,954 | 7/1996 | Emi | 375/202 |

FOREIGN PATENT DOCUMENTS

| | | |
|---|---|---|
| 0182762A1 | 5/1986 | European Pat. Off. |
| 0565127A2 | 10/1993 | European Pat. Off. |
| 2612028 | 9/1988 | France |
| 2699769 | 6/1994 | France |
| 2169477 | 7/1986 | United Kingdom |
| WO 93/20625 | 10/1993 | WIPO |

*Primary Examiner*—Wellington Chin
*Assistant Examiner*—William Luther
*Attorney, Agent, or Firm*—Flehr Hohbach Test Albritton & Herbert LLP

[57] ABSTRACT

A base station communicates with a plurality of mobile stations over a cellular network. In one embodiment, the base station includes a receiver having a receiver synthesizer input, where the receiver is configured to receive inbound information from the mobile station on a first predetermined frequency. The receiver further has two programmable frequency sources that are configured to alternately supply a receiver synthesizer input signal to the receiver. The base station also includes a transmitter having a transmitter synthesizer input, where the transmitter is configured to transmit outbound information to the mobile station on a second predetermined frequency. The transmitter further has two programmable frequency sources that are configured to alternately supply a transmitter synthesizer input signal to the transmitter. A processor is connected to the receiver and the transmitter and is configured to decode the inbound information and to encode the outbound information to communicate with the mobile station. This two-way communication continues by programming and then alternately selecting the receive synthesizers to receive on the correct frequency, and by programming and then alternately selecting the transmit synthesizers to transmit on the correct frequency. A preferred protocol is Global Systems for Mobile Communication (GSM).

26 Claims, 10 Drawing Sheets

| # | MS TRANSMIT | MS RECEIVE |
|---|---|---|
| 0 | m0 | m0+45MHz |
| 1 | m1 | m1+45MHz |
| 2 | m2 | m2+45MHz |
| 3 | m3 | m3+45MHz |
| ⋮ | ⋮ | ⋮ |
| N−1 | mN−1 | mN−1+45MHz |

5,781,582

FREQUENCY AGILE TRANSCEIVER WITH MULTIPLE FREQUENCY SYNTHESIZERS PER TRANSCEIVER

RELATED APPLICATIONS

The present application incorporates the following patent applications by reference: U.S. Ser. No. 08/435,709, filed on May 4, 1995; U.S. Ser. No. 08/435,838, filed on May 4, 1995; U.S. Ser. No. 08/434,554, filed on May 4, 1995; and U.S. Ser. No. 08/1434,598, filed on May 4, 1995.

FIELD

The present invention relates to a spread spectrum communication network with adaptive frequency agility. In particular, the present invention is used in a cellular communication network to improve the information channel capacity by adapting the spread spectrum frequencies to reduce interference and improve performance.

BACKGROUND

Spread spectrum communication typically includes two type of techniques: direct sequence spread spectrum (FHSS), where the information signal in-phase and quadrature-phase are varied; and frequency hopping spread spectrum (FHSS), where the information carrier frequency is varied. Moreover, these techniques can include formats for what is known as time division multiple access (TDMA) and frequency division multiple access (FDMA). These formats dedicate a specific periodic time slot or frequency to each mobile station. Advantages of DSSS, FHSS, TDMA and FDMA include reduced co-channel interference and improved information channel capacity over a given bandwidth. While these techniques can-be employed independently, they can also be combined.

One limitation of existing communication networks is that the base station must have a multiplicity of dedicated transmitters and receivers to adequately process all the mobile station signals. Since each base station transmitter and receiver can communicate only one frequency, a large number of transmitters and receivers are required to serve the communication network employing multiple frequencies. For example, eight transmitters and eight receivers are required to serve eight receive frequencies and eight transmit frequencies.

Moreover, since existing communication networks use a multiplicity of dedicated transmitters and receivers, a fault can cause data to be lost, or even cause the network to malfunction. When a transmitter or receiver is broken, the network must operate in a reduced capacity, if it can operate at all.

Another limitation of existing communication networks is that the FHSS protocol sequence is predetermined. That is, the frequency hops are periodic within the same frequency set. This results in continual interference from other operating electromagnetic fields. The existing communication protocols do not adapt to avoid interference.

Another limitation of existing communication networks is that the processing is performed within a central signal processor. A central signal processor employs software to perform the procedures necessary to process the data. While this configuration provides high flexibility, it is also slow and requires high computational and memory overhead.

Another limitation of existing communication networks is that in the communication protocol, the specific periodic TDMA time slot is fixed. Each mobile station is entitled to a single slot and may not receive an additional slot even if other mobile stations are not fully utilizing their respective information channel capacity.

SUMMARY

The present invention relates to a spread spectrum communication network with adaptive frequency agility. In particular, the present invention is used in a cellular communication network to improve the information channel capacity by adapting the spread spectrum frequencies to reduce interference and improve performance. Exemplary embodiments are provided for use with the Global Systems for Mobile Communication (GSM) protocol.

A base station communicates with a plurality of mobile stations over a cellular network. In one embodiment, the base station includes a receiver having a receiver synthesizer input, where the receiver is configured to receive inbound information from the mobile station on a first predetermined frequency. The receiver further has two programmable frequency sources that are configured to alternately supply a receiver synthesizer input signal to the receiver. The base station also includes a transmitter having a transmitter synthesizer input, where the transmitter is configured to transmit outbound information to the mobile station on a second predetermined frequency. The transmitter further has two programmable frequency sources that are configured to alternately supply a transmitter synthesizer input signal to the transmitter. A processor is connected to the receiver and the transmitter and is configured to decode the inbound information and to encode the outbound information to communicate with the mobile station. This two-way communication continues by programming and then alternately selecting the receive synthesizers to receive on the correct frequency, and by programming and then alternately selecting the transmit synthesizers to transmit on the correct frequency.

In another embodiment, the communication frequencies are modified to reduce interference. The processor maintains statistics on the communication error rates and modifies the frequency hopping table (also known as a mobile allocation table) to avoid error prone frequencies. This is an adaptive modification based on the communication error rates with respect to frequency. In a first aspect of the invention, the base station gathers error rate statistics. In a second aspect of this embodiment, both the base station and the mobile station gather error rate statistics since they-each transmit and receive in different frequency bands. In a third aspect of this embodiment, the base station has an additional receiver that receives on the mobile station receiver frequency band. The additional receiver scans the available mobile station receive frequencies to identify those frequencies that contain interference and those frequencies that are clear. Then, the base station processor modifies the frequency hopping table to avoid error prone frequencies.

The advantages of the present invention include reduced interference, improved communication bandwidth, fault tolerance, and more efficient and cost-effective base stations and mobile stations.

BRIEF DESCRIPTION OF THE DRAWINGS

Additional advantages of the invention will become apparent upon reading the following detailed description and upon reference to the drawings, in which.

DETAILED DESCRIPTION

The present invention relates to a spread spectrum communication network with adaptive frequency agility. In particular, the present invention is used in a cellular communication network to improve the information channel capacity by adapting the spread spectrum frequencies to improve performance and reduce interference. Exemplary embodiments are provided for use with the Global Systems for Mobile Communication (GSM) communication protocol.

Figure 1:
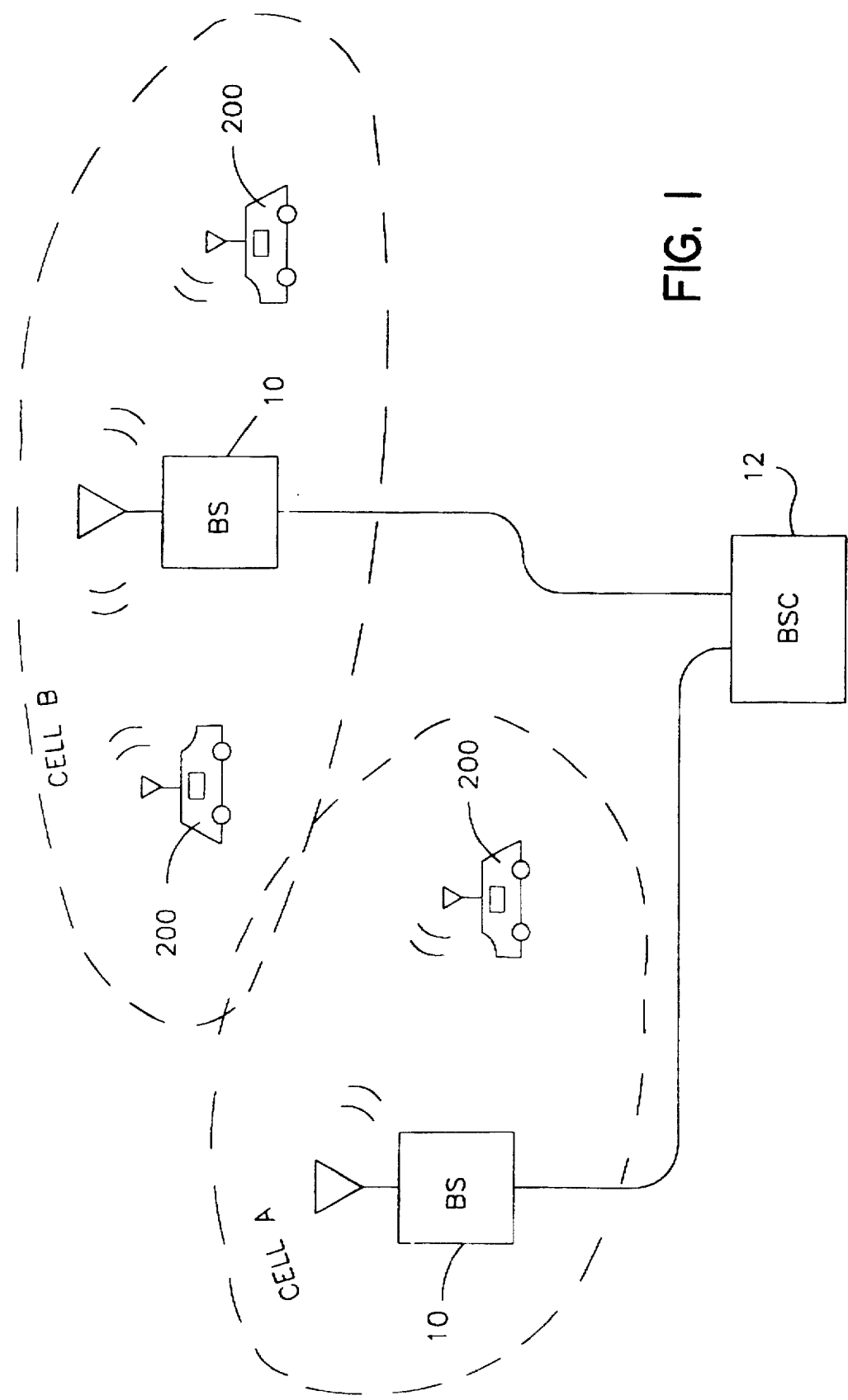
FIG. 1 depicts a cellular network showing several base stations and several mobile stations.

The exemplary embodiments are described herein with reference to specific configurations and protocols. Those skilled in the art will appreciate that various changes and modifications can be made to the exemplary embodiments while remaining within the scope of the present inventions A first embodiment is described with reference to FIGS. 1 through 6. FIG. 1 is a relatively general illustration of a cellular communication network. A number of base stations (BS) 10 are positioned to serve a number of geographically distinct cells, for example cell A and cell B. Each base station 10 is responsible for serving all the mobile stations (MS) 200 within its respective cell boundary. To perform this task, each base station 10 downloads a frequency hopping table (also known as a mobile allocation table) to each mobile station 200 so that the communication between base station 10 and mobile station 200 is on predefined frequencies, as explained more fully below.

A base station controller (BSC) 12 is connected to every base station 10, typically via land line 92, and controls the communication between users, such as between mobile station users or existing infrastructure telephone users. Moveover, base station controller 12 controls the hand-off from one base station 10 to another base station 10 as a mobile station 200 moves among cells.

A protocol selected for the embodiments is the Global Systems for Mobile Communication (GSM) protocol. The GSM protocol is lengthy and complicated. Therefore, the salient features are discussed with respect to the embodiments. For additional information on the subject, the reader is referred to the GSM specification. One important GSM protocol requirement is frequency hopping spread spectrum (FHSS). That is, sequentially communicating over more than one frequency.

Figures 2A, 2B:
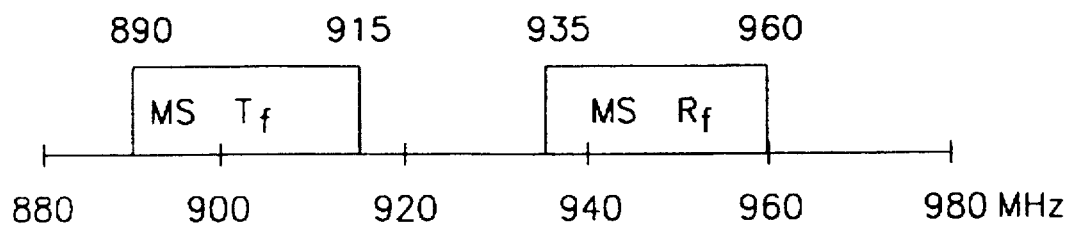
FIGS. 2A–C illustrate the frequency bands allocated to GSM communication, a typical frequency hopping table, and the GSM frequency hopping algorithm.
Figure 2C:
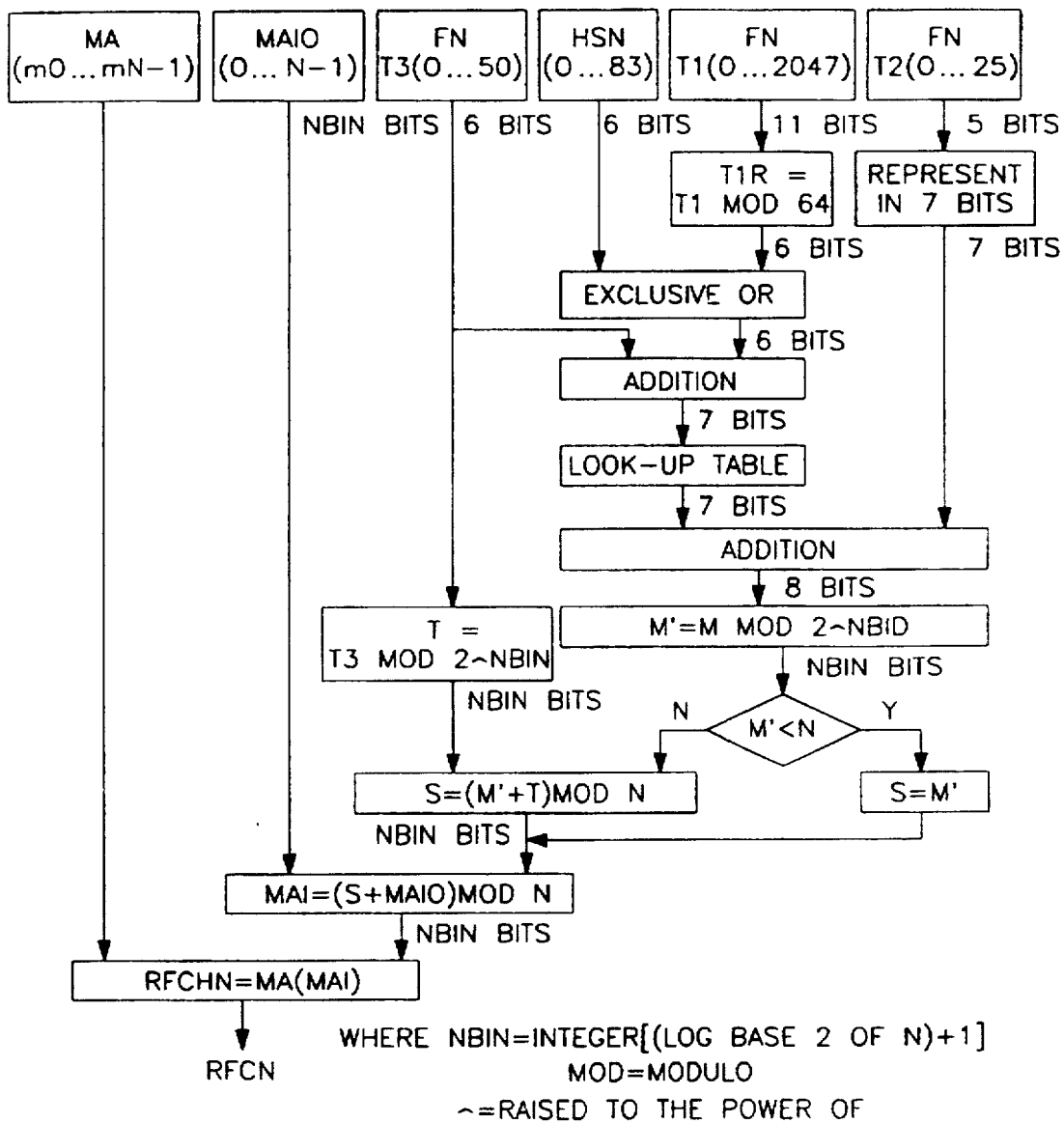

FIG. 2A shows the allocated frequency spectrum for GSM communication (from the mobile station standpoint). As can be seen, the mobile station transmit frequency band ($T_f$) is disjoint from the mobile station receive frequency band ($R_f$). Each of these frequency bands occupies approximately 25 MHz. Within that 25 MHz, there are 124 200 KHz frequency steps on which the communication frequencies are permitted to hop. The specific hopping sequence is a function of the GSM hopping algorithm defined by the GSM specification and a given frequency hopping table that is downloaded from base station 10 to mobile station 200. An example frequency hopping table is presented in FIG. 2B. Based on the GSM hopping algorithm (FIG. 2C), the mobile station receiver and transmitter operate on specified 200KHz frequencies in their respective frequency bands $T_f$, $R_f$. Of course, the base station $T_f$ and $R_f$ correspond to the mobile station $R_f$ and $T_f$ respectively.

Figure 3:
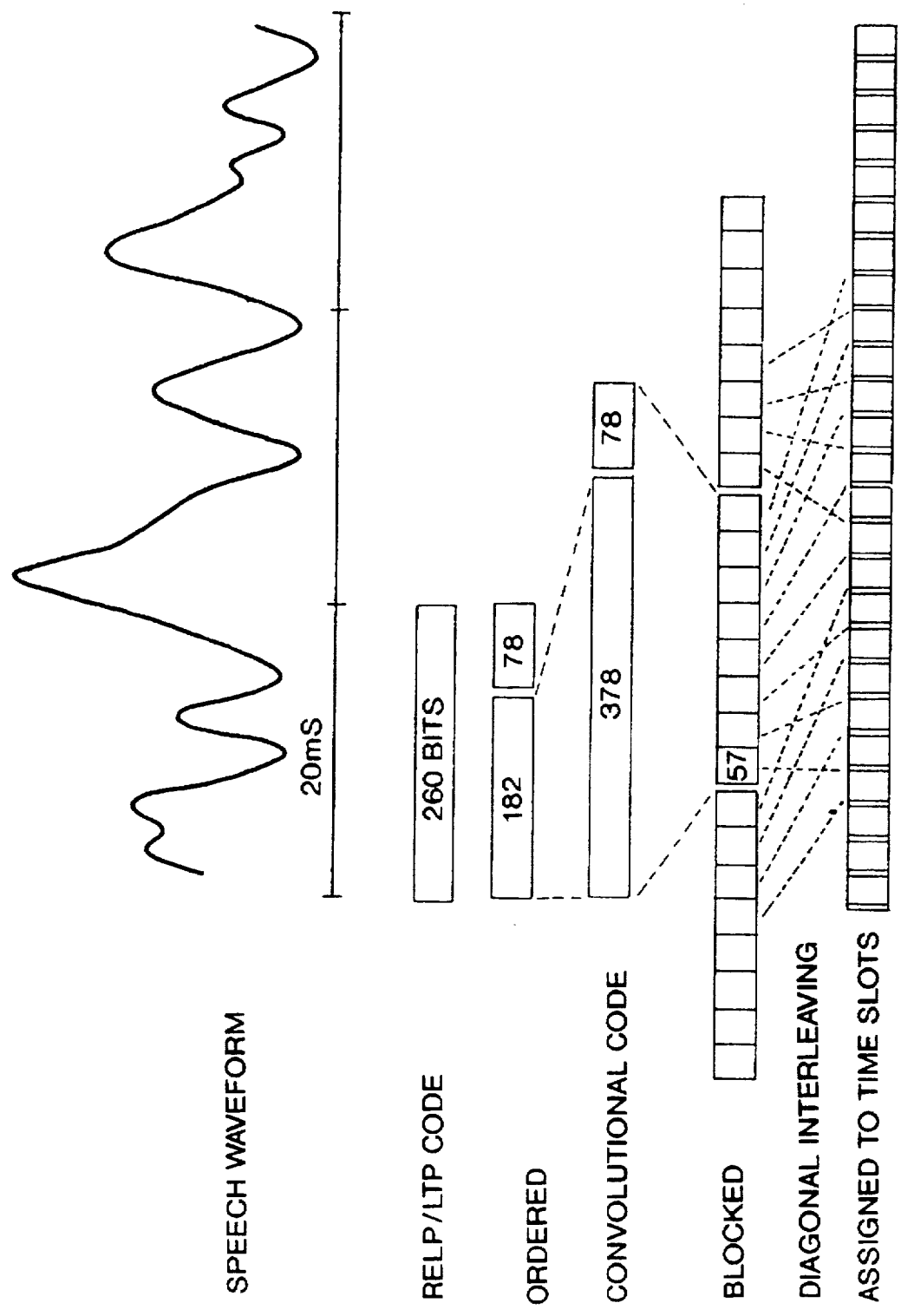
FIG. 3 illustrates a speech waveform sampled and assembled into a digital GSM format.
Figure 4:
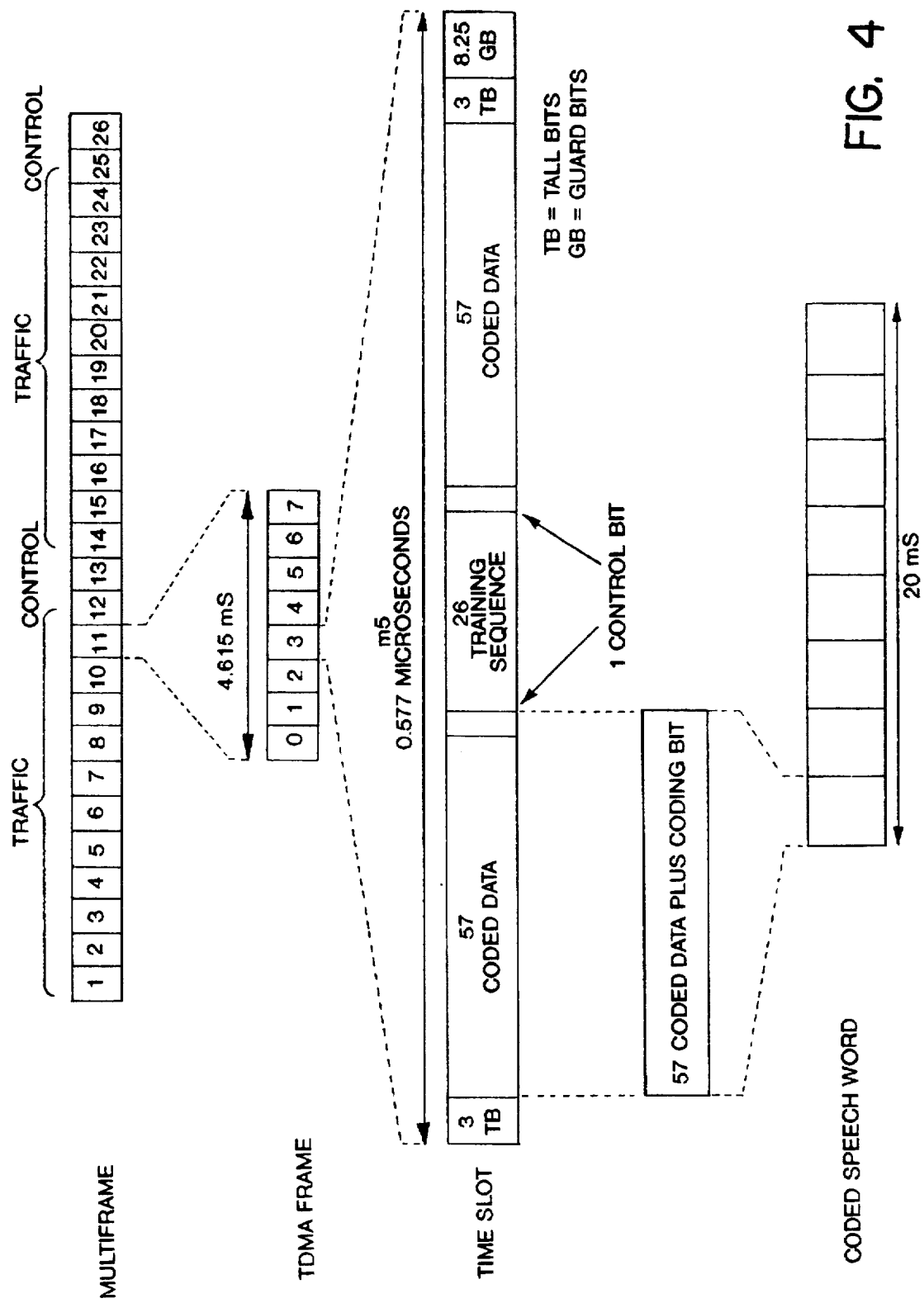
FIG. 4 illustrates a GSM frame and associated data.

Since GSM is a digital data communication network, FIG. 3 shows how a speech waveform is sampled and digitally encoded. FIG. 4 shows how the encoded data is formatted into the GSM word. Note that the information from one mobile station 200 is processed and placed into a specific time slot reserved for that particular mobile station 200 within a TDMA frame. Further, note that after the TDMA frame is collected, a multiframe is constructed from 26 TDMA frames, including 24 TDMA speech frames and 2 control frames. Beyond the multiframe are superframes and hyperframes. There are 51 multiframes in a superframe, and there are 2048 superframes in a hyperframe. The hyperframe number is one variable used by the GSM frequency hopping algorithm to define the frequency hopping sequence.

Based on the GSM frequency hopping algorithm (FIG. 2C), the TDMA frames are then frequency hopped over the frequencies of the frequency hopping table. The mobile station receivers are also periodically hopped onto a fixed monitor frequency that is unique to each base station. The frequency hopping serves to spread the communication signal over the frequency bands $T_f$, $R_f$. An advantage of spread spectrum is reduced interference effects from other electro-magnetic sources and other base station/mobile station communications. For the mobile station, three frequencies are tuned onto in one 4.615ms TDMA time frame (transmit, receive, monitor). Each mobile station transmitter and receiver synthesizer has 1 or 2 time slots (4.615 ms times ⅛ or ⅖, i.e., 0.58 ms or 1.15 ms) to change frequencies. Frequency hopping once per frame is easily accomplished because the synthesizers have plenty of time (1 or 2 time slots) to settle before a new reception or transmission is required. However, the base station receiver and transmitter have only 30 μs to change frequencies (the time duration of the guard bits). This short time period is difficult to accommodate, so the invention incorporates a plurality of receiver synthesizers and transmitter synthesizers as now explained.

Figure 5:
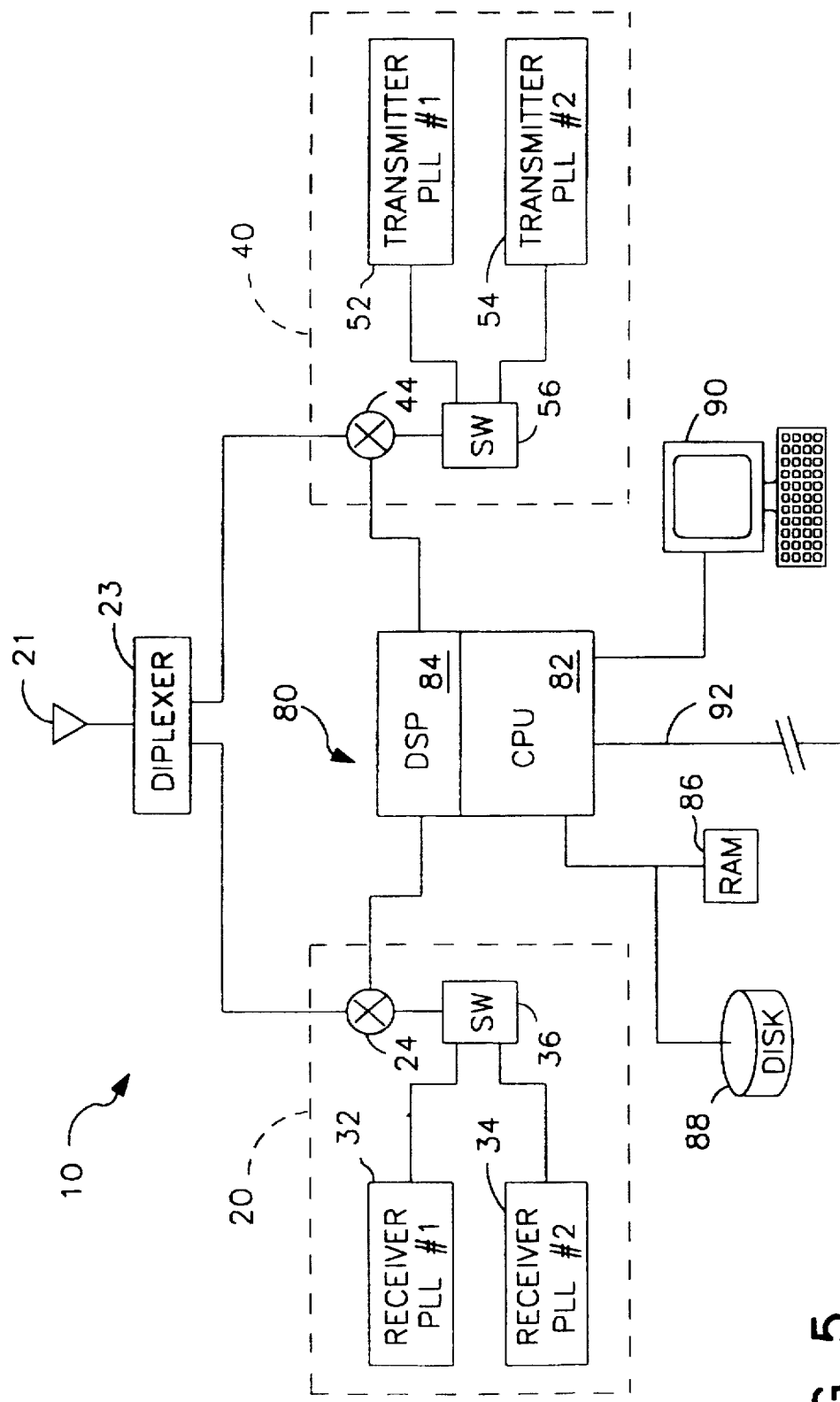
FIG. 5 depicts one embodiment of a base station architecture according to the invention.
Figure 6:
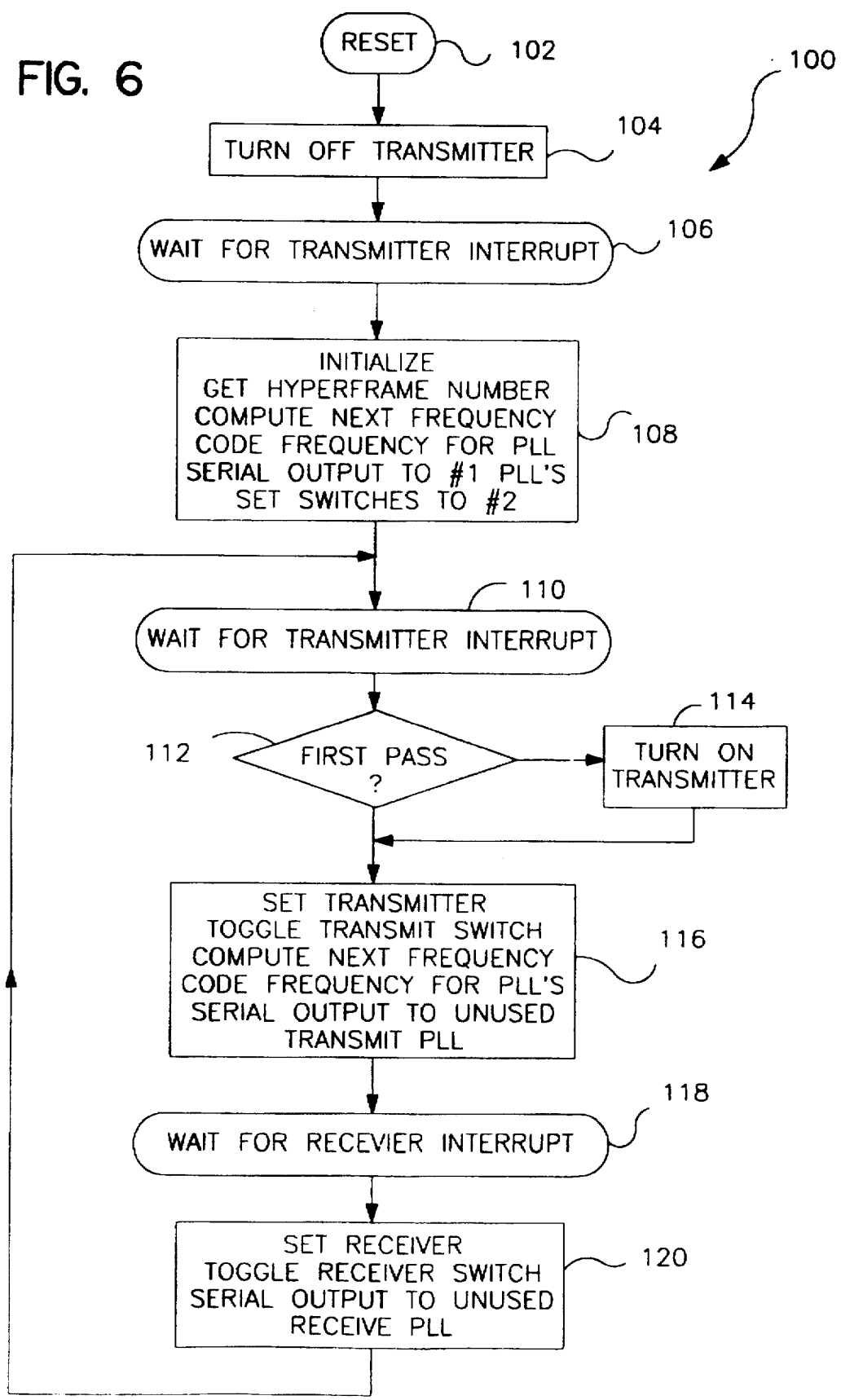
FIG. 6 is a flow-chart showing steps performed by the base station of FIG. 5 for controlling frequency.

FIG. 5 depicts a base station 10 having a receiver 20, a transmitter 40 and a processor 80. As shown, receiver 20 and transmitter 40 share common antenna 21 via diplexer 23. This configuration is possible since the receive frequency and transmit frequency are different (see FIG. 2A). Diplexer 23 is used to permit the receive frequency to pass from antenna 21 to receiver 20, and to permit the transmit frequency to pass from transmitter 40 to antenna 21. Receiver 20 and transmitter 40 each employ two independent synthesizers in order to facilitate fast frequency agility. The detail of the embodiment and the operation is explained with reference to the FIG. 6 flow chart.

The reset step 102 is performed only at start-up, such as when base station 10 initially comes on-line or when recovering from a power failure. Step 104 is turns off transmitter 40 to prevent invalid transmission before initialization of the base station 10. Thereafter, step 106 waits for the processor 80 to perform its self-test and other required procedures before base station 10 can become operational in the cellular network. Step 108 calculates the required first frequency and the subsequent second frequency from the GSM hyperframe number and the frequency hopping table. Once these first and second frequencies are calculated, the first and second receiver synthesizers 32, 34, and transmitter synthesizers 52, 54 are programmed to generate the required frequencies. At this point, the switches 36, 56 are set to provide the mixers 24, 44 with the frequencies from the first synthesizers 32, 52 respectively.

A loop sequence begins with step 110, where processor 80 waits for the transmitter interrupt from the CPU 82 to indicate that the TDMA frame should be processed. If the step 112 is being queried for the first time (i.e., transmitter 40 was turned off in step 104), step 114 is performed to turn transmitter 40 on. Once transmitter 40 is on, step 116 proceeds to transmit a TDMA frame and then to toggle the transmitter synthesizer selector switch 56 to the other transmitter synthesizer 54. Step 116 also calculates the next transmitter frequency and programs the previously active synthesizer 52 to generate that frequency.

When the receiver interrupt occurs in step 118, step 120 proceeds to receive a TDMA frame and then to toggle the receiver synthesizer selector switch 36 to the other receiver synthesizer 34. Step 120 also calculates the next receiver frequency and programs the previously active synthesizer 32 to generate that frequency.

Steps 110 through 120 are then repeatedly performed to transmit and receive the TDMA frames to and from the mobile stations 200 on the proper frequencies. This configuration of the dual synthesizer receiver 20 and dual synthesizer transmitter 40 permits base station 10 to faithfully accomplish all the frequency hops required for proper communication.

It is important to note that base station 10 of FIG. 5 employs processor 80 to orchestrate the synthesizers 32, 34, 52, 54 and the synthesizer switches 36, 56. Processor 80 includes a central processing unit (CPU) 82 for performing many of the general procedures required to communicate over the network with mobile station 200; Processor 80 also performs procedures necessary to communicate with base station controller 12. A digital signal processor (DSP) 84 is included in processor 80 to perform many of the application specific and computationally intensive procedures such as encoding and decoding the TDMA frame data. As shown, the processor 80 also includes memory (RAM) 86 and bulk disk memory 88. Moreover, user interface 90 is provided to receive instructions from a user and to display requested information. Ground line 92 is also provided to connect to base station controller 12 and other base stations 10 as required by the GSM specification.

In actual implementation, it is useful to employ a plurality of receivers in order to perform both TDMA and FDMA, as provided by the GSM specification. In a conventional configuration, each receiver is tuned to a fixed frequency and frequency-hopped information from the mobile stations is received by various receivers depending on the specified communication frequency. Then the conventional processor must re-assemble inbound information from a plurality of receivers to obtain data from one mobile station. Moreover, the conventional processor must dis-assemble outbound information and deliver it to a plurality of transmitters to properly transmit information to a mobile station.

Figure 7:
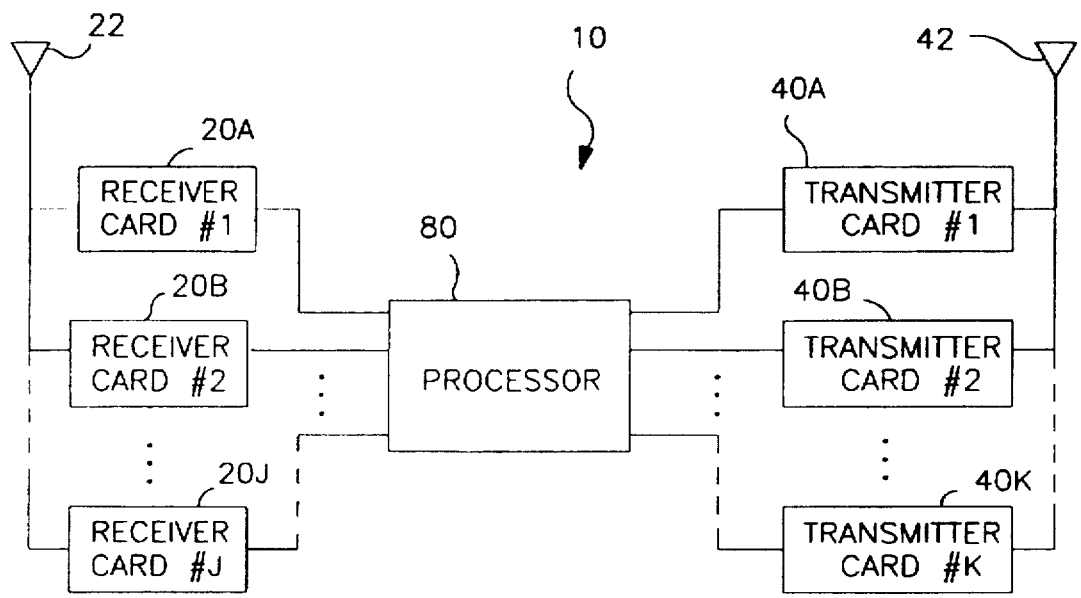
FIG. 7 depicts another embodiment of a base station architecture according to the invention.

FIG. 7 depicts another embodiment of a base station 10 according to the invention. There are provided a plurality of receivers 20A-J that are frequency agile (as shown in FIG. 5). Hence, receivers 20A-J can be programmed to receive various frequencies over time and can receive information from each mobile station 200 on a respective one of receivers 20A-J. This feature permits both FDMA received signals and TDMA received signals associated with one mobile station 200 to be received by one of the receivers 20A-J. Because processor 80 programs the receiver synthesizers, processor 80 has a priori knowledge of which receiver 20A-J is receiving communication signals from which mobile station 200. This information permits the processor to more efficiently process the inbound data. For example, if the signal from one mobile station 200 is always received in receiver card one 20A, then the processor can reduce its control logic (hardware, software, or both) to avoid the conventional step of re-assembling a mobile station's data from a number of different receivers. Also, configuring a plurality of frequency agile receivers 20A-J in parallel permits processor 80 to reconfigure receivers 20A-J at any time a fault is detected. If, for example, processor 80 detects a fault in receiver 20A (e.g., by self-test, null data, or corrupted data), processor 80 re-programs another receiver, such as receiver 20J, to operate on the parameters that were previously assigned to receiver 20A. The feature of agile receivers and enhanced processing resource allocation reduces overhead, permits fault tolerance, and increases throughput since it eliminates a processing step.

There are also provided a plurality of transmitters 40A-K that are frequency agile (as in FIG. 5). Hence, transmitters 40A-K can be programmed to transmit various frequencies over time and can transmit information to each mobile station 200 on a respective one of transmitters 40A-K. This feature permits both FDMA transmitted signals and TDMA transmitted signals associated with one mobile station 200 to be transmitted by one of the transmitters 40A-K. Because processor 80 programs the transmitter synthesizers, processor 80 has a priori knowledge of which transmitter 40A-J is transmitting communication signals to which mobile station 200. This information permits the processor to more efficiently process the outbound data. For example, if the signal to one mobile station 200 is always transmitted by transmitter one 40A, then the, processor 80 can reduce its control logic (hardware, software, or both) to avoid the conventional step of disassembling a mobile station's data and delivering it to a number of different transmitters. Also, configuring a plurality of frequency agile transmitters 40A-K in parallel permits processor 80 to reconfigure transmitters 40A-K at any time a fault is detected. If, for example, processor 80 detects a fault in transmitter 40A (e.g., by self-test, null data received by the mobile station, or corrupted data), processor 80 re-programs another transmitter, such as transmitter 40K, to operate on the parameters that were previously assigned to transmitter 40A. The feature of agile transmitters and enhanced processing resource allocation reduces overhead, permits fault tolerance, and increases throughput since it eliminates a processing step.

As shown, receivers 20A-J and transmitters 40A-K are coupled to receive antenna 22 and transmit antenna 42 respectively. However, a common antenna 21 can be employed as shown in FIG. 5. Also as shown, transmitters 40A-K are coupled to single transmit antenna 42. However, if transmitters 40A-K are sensitive to back propagation of each. other's transmissions, a plurality of transmit antennas (42A-K) can be employed with each transmitter having its own transmit antenna. Moreover, corresponding receivers and transmitters, e.g. 20A and 40A, 20B and 40B, 20C and 40C, can be grouped and combined to have common antennas 21A, 21B and 21C respectively, as shown in FIG. 5.

Additional base station embodiments are described in U.S. Ser. No. 08/1434,598, filed on May 4, 1995.

Figure 8:
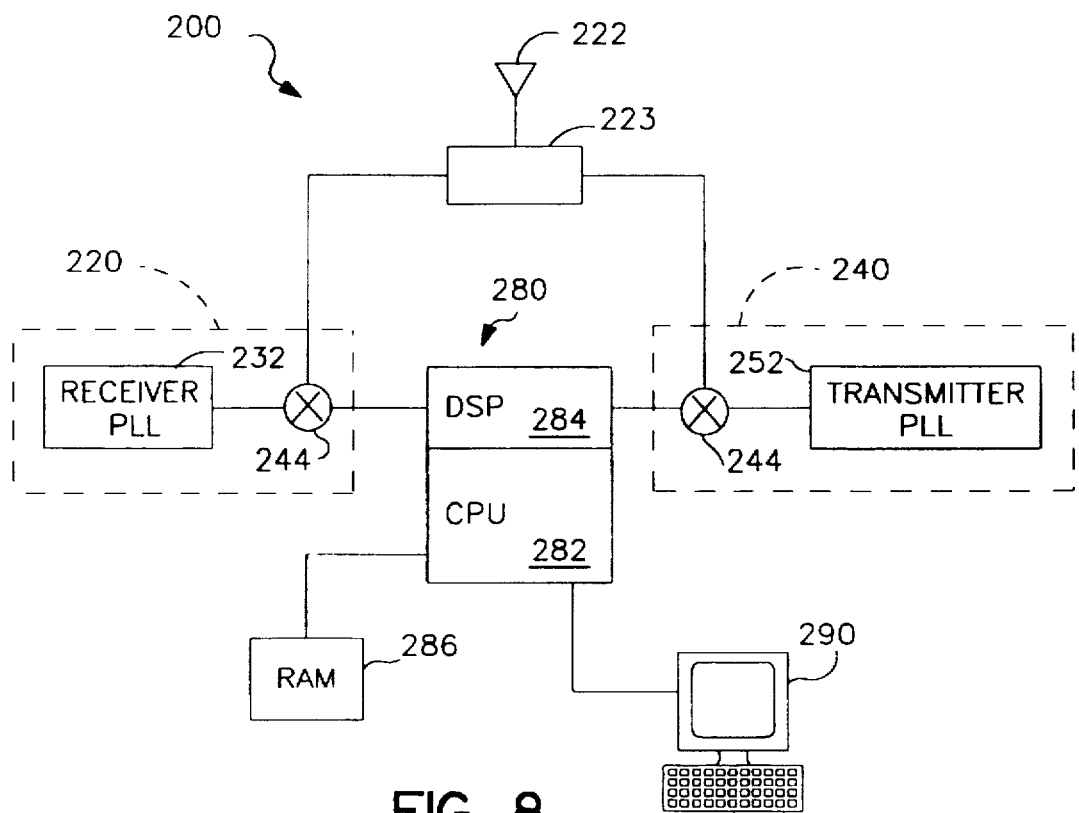
FIG. 8 depicts one embodiment of a mobile station according to the invention.

A mobile station 200 is depicted in FIG. 8. Mobile station 200 is similar to base station 10, but requires less hardware since the purpose is to serve only one user. A receiver 220 is provided connected to a common antenna 222 via diplexer 223. Processor 280 reads the stored frequency hopping table and calculates the proper receive frequency for the inbound TDMA frame. Processor 280 then programs receiver synthesizer 232 to generate that frequency. Receiver synthesizer 232 provides the frequency to the receiver mixer 224, which down-mixes the received signal and provides an information signal to processor 280. Processor 280 then decodes the received TDMA frame. Processor 280 includes a CPU, 282, DSP 284, RAM 286 and user interface 290 (e.g. keypad and LCD display), much like base station 10. A transmitter 240 is provided connected to the common antenna 222 via diplexer 223. The CPU reads the frequency hopping table and calculates the proper transmit frequency for the outbound TDMA frame. Processor 280 then programs the transmitter synthesizer 252 to generate that frequency. Processor 280 encodes the transmit TDMA frame data. Transmitter synthesizer 252 then provides the transmit frequency to the transmitter mixer 244, which up-mixes an information signal containing the TDMA frame data and provides a radio frequency signal to be transmitted via antenna 222.

In another embodiment, the frequency hopping table is modified to reduce interference. This is done by continually monitoring the error rates of the communication. Processor 80 maintains statistics on the communication error rates and modifies the frequency hopping table to avoid error-prone frequencies.

Figure 9A:
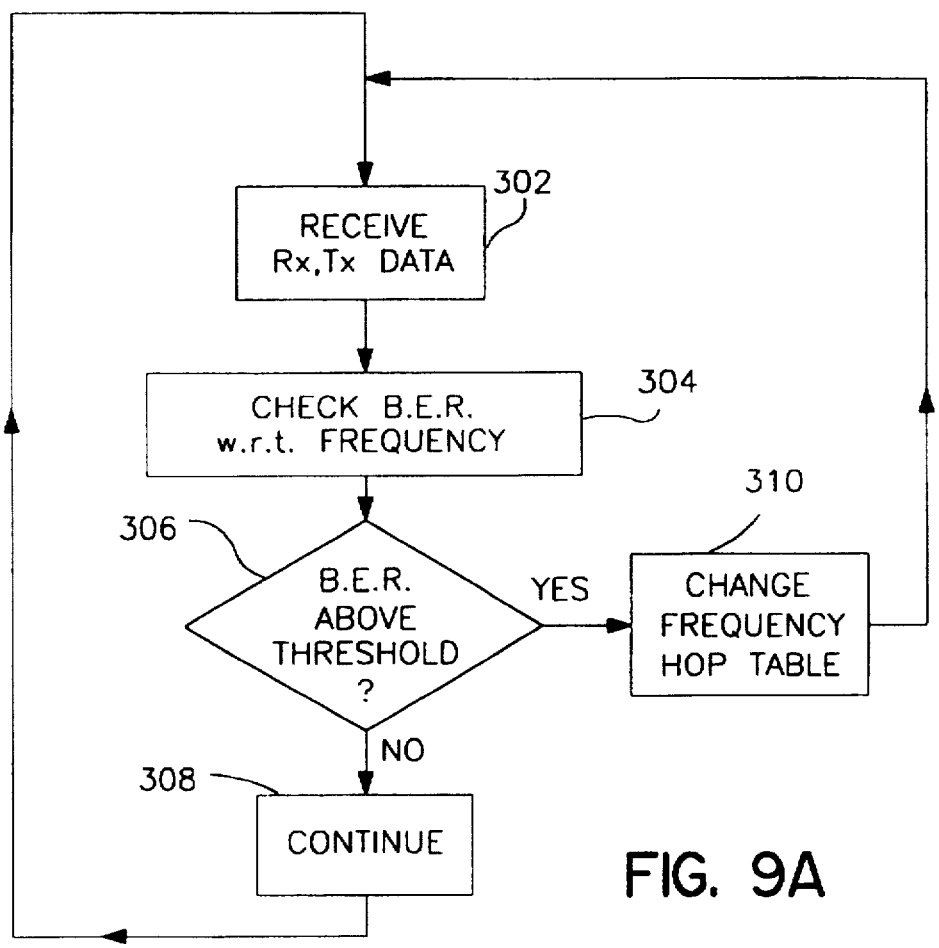
FIGS. 9A–B are flow charts showing steps performed by the base station of FIG. 5 and the mobile station of FIG. 8 to gather and store statistics regarding communication error rates.
Figure 9B:
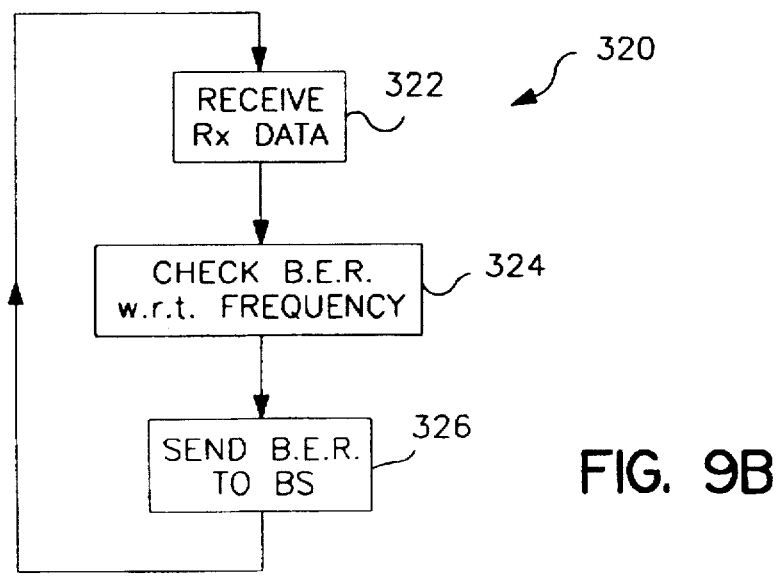

In a first aspect of this embodiment, shown in FIGS. 9A–B, base station 10 gathers error rate statistics. This feature of gathering statistics of bit error rates (BER) is included in the GSM protocol specification. Base station 10 operation is shown in FIG. 9A flow chart 300. Receiver 20 receives the signal from mobile station 200 and decodes the TDMA frame in step 302. Then the TDMA raw data is error-corrected by the CPU 80 to obtain valid data. In step 304 the processor 80 builds a database storing the errors with respect to frequency. Ordinarily the errors stored are bit error rates (BER). If few errors are detected, step 308 continues the receiving steps for receiving the signal from mobile station 200 without modification. However, if an error-prone frequency is observed in step 306, step 310 calculates a different set of frequencies that may have less error-prone tendencies and then re-programs base station 10 and mobile station 200 with a new frequency hopping table. Step 310 may estimate which frequencies are less crowded, or may look to the error rate database to avoid error-prone frequencies.

In a second aspect of this embodiment, also described with respect to FIGS. 9A–B, both base station 10 and mobile station 200 gather statistics since they each transmit and receive on different frequencies. This feature of gathering error rate statistics of is included in the GSM communication protocol specification. Base station 10 operation is shown in FIG. 9A flow chart 300. Receiver 20 receives the signal from mobile station 200 and down-mixes the information signal in step 302. Then the TDMA raw data is decoded by the processor 80 and error corrected to obtain valid data. In step 304 the processor 80 builds a database storing the errors with respect to frequency. Ordinarily the errors stored are bit error rates (BER). If few errors are detected, step 308 continues the receiving steps for receiving the signal from mobile station 200 without modification. However, if an error-prone frequency is observed in step 306, step 310 calculates a different set of frequencies that may have less error-prone tendencies and then re-programs base station 10 and mobile station 200 with a new frequency hopping table. Step 310 may estimate which frequencies are less crowded, or may look to the error rate database to avoid error-prone frequencies.

FIG. 9B shows mobile station 200 detecting and storing error-rate statistics. The receiver 220 receives the signal from the base station 10 and down-mixes the information signal in step 322. Then the TDMA raw data is decoded by the processor 280 and error corrected to obtain valid data. In step 324 the processor 280 builds a database storing the errors with respect to frequency. Ordinarily the errors stored are bit error rates (BER). This information is uploaded to base station 10 to make a determination of whether the error-rate statistics warrant modifying the mobile station transmit frequency hopping table. If an error-prone frequency is observed in step 324, then FIG. 9A step 310 calculates a different set of frequencies that may have less error-prone tendencies and then re-programs base station 10 and mobile station 200 with a new frequency hopping table. Step 310 may estimate which frequencies are less crowded, or may look to the error rate database to avoid error-prone frequencies.

Figure 10:
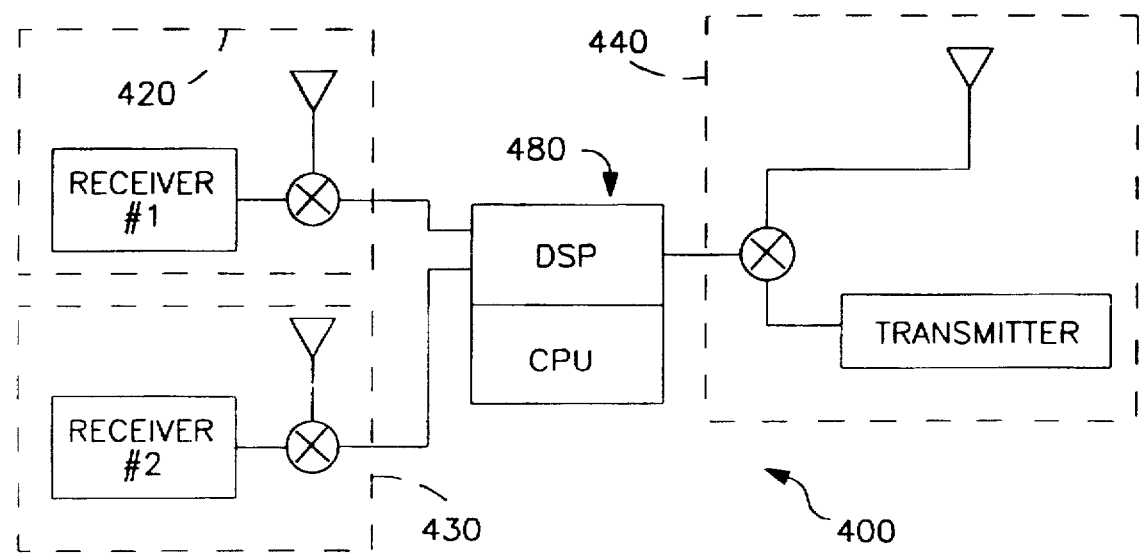
FIG. 10 depicts another embodiment of a base station according to the invention, where the base station includes an additional receiver to scan the mobile station receive frequency band.
Figure 11:
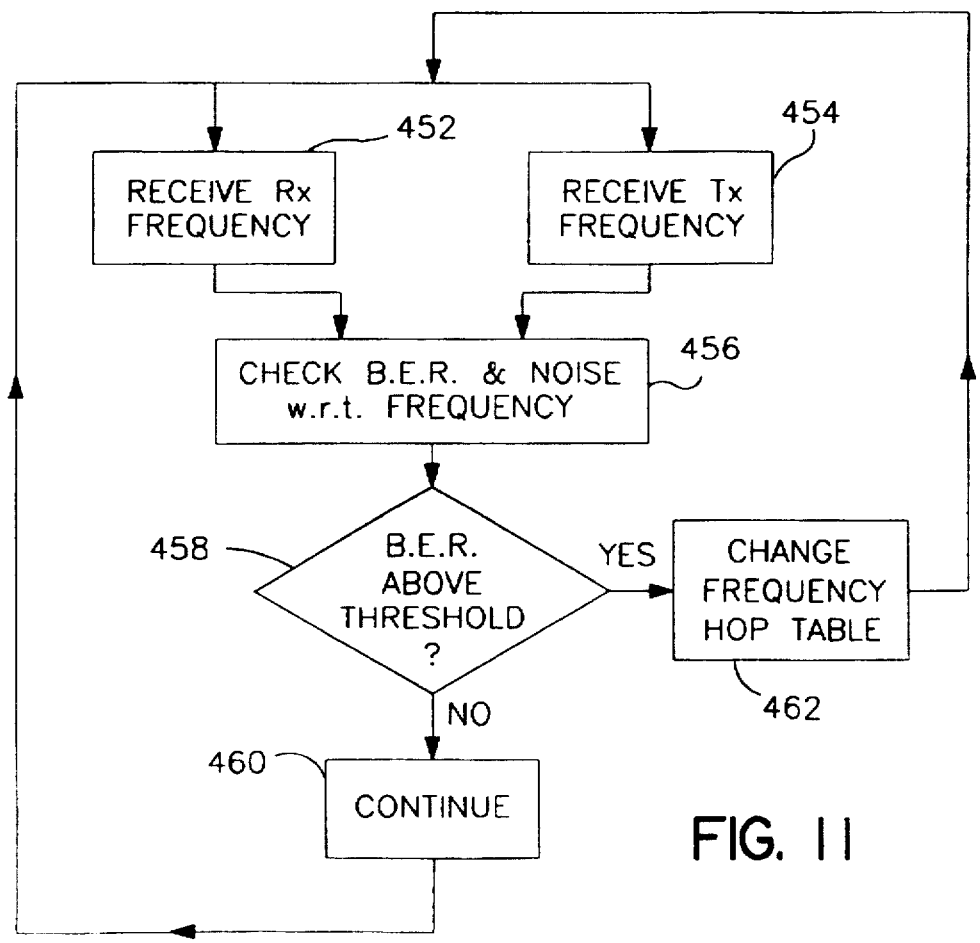
FIG. 11 is a flow chart showing steps performed by the base station of FIG. 10 to gather and store statistics regarding communication error rates.

In a third aspect of this embodiment depicted in FIG. 10, base station 10 has an additional receiver 30 that receives on the mobile station receiver frequency band. The additional receiver 30 scans available frequencies to identify frequencies that contain interference and frequencies that are clear. FIG. 11 shows a flow chart 450 where the receive frequency is received in step 452 and the transmit frequency is received in step 454. In one alternative, the receiver 30 is designed to scan the frequencies for noise. The receiver 30 is never tuned to the same frequency as the transmitter 40. This avoids saturation of the receiver 30. In another alternative, the receiver 30 is located away from the transmitter 40, and the receiver 30 is tuned to the same frequency as the transmitter 40. In either event, the purpose of the additional receiver 30 is to employ a directly accessible receiver that provides either noise level or error rate feedback to base station 10. Step 456 checks the noise threshold or error-rate of the signal from receiver 30, and checks for interference on the transmit frequency. If no significant data corruption or interference is present, step 458 initiates step 460, which continues the process from the beginning. However, if step 458 detects high corruption or interference, then step 462 is executed to modify the transmit frequency hopping table, the receive frequency hopping table, or both.

Advantages of the present invention include reduced interference, improved communication bandwidth, fault tolerance, and more efficient and cost-effective base stations and mobile stations.

As used herein, when a first element and a second element are coupled, they are related to one another, but need not have a direct path to one another. For example, an antenna element may be coupled to a processing element via a receiver. However, when a first element and second element are connected, they are required to have a direct path to one another.

ALTERNATIVE EMBODIMENTS

Having disclosed exemplary embodiments and the best mode, modifications and variations may be made to the disclosed embodiments while remaining within the scope of the present invention as defined by the following claims.

What is claimed is:

1. A base station for communicating over a cellular network with a mobile station, said base station comprising:
   a receiver having a receiver synthesizer input and configured to receive inbound information from the mobile station on a predetermined receive frequency, said receiver further having two controllable receiver frequency sources that are configured to alternately supply a receiver synthesizer signal to said receiver synthesizer input;
   a transmitter having a transmitter synthesizer input and configured to transmit outbound information to the mobile station on a predetermined transmit frequency, said transmitter further having two controllable transmitter frequency sources that are configured to alternately supply a transmitter synthesizer signal to said transmitter synthesizer input; and
   a processor coupled to said receiver and said transmitter and configured to decode said inbound information and to encode said outbound information to communicate with the mobile station.

2. The base station of claim 1, wherein:
   said two receiver frequency sources each include a voltage controlled oscillator combined with a phase-locked feedback loop to maintain a respective first receiver synthesizer frequency and second receiver synthesizer frequency, and wherein said two receiver frequency sources are coupled to said processor;
   said receiver further includes a switch coupled to each of said receiver frequency sources, and selectable between a first position to deliver said first receiver synthesizer frequency to said receiver synthesizer input and a second position to deliver said second receiver synthesizer frequency to said receiver synthesizer input;
   said two transmitter frequency sources each include a voltage controlled oscillator combined with a phase-locked feedback loop to maintain a respective first transmitter synthesizer frequency and second transmitter synthesizer frequency, and wherein said two receiver frequency sources are coupled to said processor; and
   said transmitter further includes a switch coupled to each of said transmitter frequency sources, and selectable between a first position to deliver said first transmitter synthesizer frequency to said transmitter synthesizer input and a second position to deliver said second transmitter synthesizer frequency to said transmitter synthesizer input.

3. The base station of claim 1 for further communicating with a second mobile station, said base station further comprising:
   a second receiver having a second receiver synthesizer input and configured to receive second inbound information from the second mobile station on a second predetermined receive frequency, said second receiver further having two controllable receiver frequency sources that are configured to alternately supply a receiver synthesizer signal to said second receiver synthesizer input; and
   wherein said processor is further coupled to said second receiver and configured to decode said second inbound information to communicate with the second mobile station.

4. The base station of claim 3, further comprising:
   a second transmitter having a second transmitter synthesizer input and configured to transmit second outbound information to the second mobile station on a second predetermined transmit frequency, said second transmitter further having two controllable transmitter frequency sources that are configured to alternately supply a second transmitter synthesizer signal to said second transmitter synthesizer input; and
   wherein said processor is coupled to said second transmitter and configured to encode said second outbound information to communicate with the second mobile station.

5. The base station of claim 1 for further communicating with a second mobile station, said base station further comprising:
   a second transmitter having a second transmitter synthesizer input and configured to transmit second outbound information to the mobile station on a second predetermined transmit frequency, said second transmitter further having two controllable transmitter frequency sources that are configured to alternately supply a transmitter synthesizer signal to said second transmitter synthesizer input;
   wherein said processor is coupled to said second transmitter and configured to encode said second outbound information to communicate with the second mobile station.

6. The base station of claim 3, wherein:
   said processor is configured to reprogram said second receiver when said first transmitter is broken.

7. The base station of claim 5, wherein:
   said processor is configured to reprogram said second transmitter when said first transmitter is broken.

8. A method of communicating over a cellular network between a mobile station and a base station having a processor, and a transmitter containing a first controllable transmitter frequency source and a second controllable transmitter frequency source, said method comprising the steps of:
   (a) receiving, via the receiver, an initialization signal from the mobile station;
   (b) computing a first transmit frequency from a predetermined timing information;
   (c) tuning the first transmitter frequency source to generate the first transmit frequency;
   (d) supplying the first transmit frequency to the transmitter;
   (e) modulating the first transmit frequency with a first transmit signal representing information, said modulating step producing a second transmit signal;
   (f) transmitting the second transmit signal, via the transmitter, to the mobile station;
   (g) computing a second transmit frequency from the predetermined timing information plus one;
   (h) tuning the second transmitter frequency source to generate the second transmit frequency;
   (i) supplying the second transmit frequency to the transmitter;
   (j) modulating the second transmit frequency with a third transmit signal representing information, said modulating step producing a fourth transmit signal;
   (k) transmitting the fourth transmit signal, via the transmitter, to the mobile station;
   (l) repeating steps (b) trough (k) with newly computed frequencies from the predetermined timing information.

9. The method of claim 8, wherein said predetermined timing information is the hyperframe number.

10. The method of claim 8, wherein said base station further has a receiver containing a first controllable receiver frequency source and a second controllable receiver frequency source, said method further comprising the steps of:

(m) computing a first receive frequency from a predetermined timing information;

(n) tuning the first receiver frequency source to generate the first receive frequency;

(o) supplying the first receive frequency to the receiver;

(p) receiving a first receive signal, via the receiver, from the mobile station;

(q) demodulating the first receive signal with the first receive frequency, said demodulating step producing a second receive signal representing information;

(r) computing a second receive frequency from the predetermined timing information plus one;

(s) tuning the second receiver frequency source to generate the second receive frequency;

(t) supplying the second receive frequency to the receiver;

(u) receiving a third receive signal, via the receiver, from the mobile station;

(v) demodulating the third receive signal with the second receive frequency, said demodulating step producing a fourth receive signal representing information;

(w) repeating steps (m) through (v) with a newly computed first receive frequency and second receive frequency from the predetermined timing information.

11. The method of claim 10, wherein said predetermined timing information is the hyperframe number.

12. A method of communicating over a cellular network between a mobile station and a base station having a processor, and a receiver containing a first controllable receiver frequency source and a second controllable receiver frequency source, said method comprising the steps of:

(a) computing a first receive frequency from a predetermined timing information;

(b) tuning the first receiver frequency source to generate the first receive frequency;

(c) supplying the first receive frequency to the receiver;

(d) receiving a first receive signal, via the receiver, from the mobile station;

(e) demodulating the first receive signal with the first receive frequency, said demodulating step producing a second receive signal representing information;

(f) computing a second receive frequency from the predetermined timing information plus one;

(g) tuning the second receiver frequency source to generate the second receive frequency;

(h) supplying the second receive frequency to the receiver;

(i) receiving a third receive signal, via the receiver, from the mobile station;

(j) demodulating the third receive signal with the second receive frequency, said demodulating step producing a fourth receive signal representing information;

(k) repeating steps (a) through (j) with a newly computed first receive frequency and second receive frequency from the predetermined timing information.

13. The method of claim 12, wherein said predetermined timing information is the hyperframe number.

14. A method of communicating over a cellular network between two mobile stations and a base station having a processor and two frequency agile transmitters, where each transmitter contains a first controllable transmitter frequency source and a second controllable transmitter frequency source, said method comprising the steps of:

tuning the first transmitter to transmit outbound information to the first mobile station;

tuning the second transmitter to transmit outbound information to the second mobile station; and when said second transmitter fails, tuning the first transmitter to transmit outbound information to the second mobile station.

15. The method of claim 14, wherein said base station further has two frequency agile receivers, where each receiver contains a first controllable receiver frequency source and a second controllable receiver frequency source, said method further comprising the steps of:

tuning the first receiver to receive inbound information from the first mobile station;

tuning the second receiver to receive inbound information from the second mobile station; and when said second receiver fails, tuning the first receiver to receive inbound information from the second mobile station.

16. A method of communicating over a cellular network between two mobile stations and a base station having a processor and two frequency agile receivers, where each receiver contains a first controllable receiver frequency source and a second controllable receiver frequency source, said method comprising the steps of:

tuning the first receiver to receive inbound information from the first mobile station;

tuning the second receiver to receive inbound information from the second mobile station; and when said second receiver fails, tuning the first receiver to receive inbound information from the second mobile station.

17. A base station for communicating over a cellular network with a first mobile station and a second mobile station, comprising:

a first receiver having a receiver synthesizer input and configured to receive inbound information from the first mobile station on a first predetermined frequency, said receiver further having two controllable receiver frequency sources that are configured to alternately supply a receiver synthesizer signal to said receiver synthesizer input;

a second receiver having a second receiver synthesizer input and configured to receive second inbound information from the second mobile station on a second predetermined frequency, said second receiver further having two controllable receiver frequency sources that are configured to alternately supply a receiver synthesizer signal to said second receiver synthesizer input;

a first transmitter having a transmitter synthesizer input and configured to transmit outbound information to the mobile station on a third predetermined frequency, said transmitter further having two controllable transmitter frequency sources that are configured to alternately supply a transmitter synthesizer signal to said transmitter synthesizer input;

a second transmitter having a second transmitter synthesizer input and configured to transmit second outbound information to the second mobile station on a fourth predetermined frequency, said second transmitter further having two controllable transmitter frequency sources that are configured to alternately supply a second transmitter synthesizer signal to said second transmitter synthesizer input; and a processor coupled to said first receiver, said second receiver, said first transmitter and said second transmitter and configured to decode said inbound information, to encode said outbound information, to store statistics regarding an inbound information error rate over said first predetermined frequency, and when said statistics indicate a high error rate, to modify said first predetermined frequency.

18. The base station of claim 17, wherein:

said processor is further configured to store a frequency table representing the available frequencies, and to modify said frequency table to modify said first predetermined frequency.

19. The base station of claim 17, wherein:

said processor is further configured to store statistics regarding an inbound information error rate over said second predetermined frequency, and when said statistics indicate a high error rate, to modify said second predetermined frequency.

20. The base station of claim 19, wherein:

said processor is further configured to store a frequency table representing the available frequencies, and to modify said frequency table to modify said first predetermined frequency and said second predetermined frequency.

21. The base station of claim 17, wherein:

said first receiver is further configured to scan available frequencies; and said processor is further configured to modify said first predetermined frequency and said second predetermined frequency based on a scan of said available frequencies.

22. The base station of claim 17, further comprising:

a second receiver coupled to said processor and configured to receiver said second predetermined frequency and to provide information regarding said second predetermined frequency to said processor.

23. The base station of claim 22, wherein:

said second receiver is configured to scan available frequencies and to provide said processor with information regarding the presence of noise on any available frequency.

24. A method of communicating over a cellular network between a mobile station and a base station having a receiver containing a first controllable receiver frequency source and a second controllable receiver frequency source, and a processor, said method comprising the steps of:

receiving inbound information from the mobile station at a first time on a first predetermined frequency associated with the first receiver frequency source and at a second time on a second predetermined frequency associated with the second receiver frequency source;

decoding said inbound information;

error-correcting the inbound information;

storing error statistics regarding the errors detected in said error-correcting step; and when the error statistics exceed a predetermined threshold, modifying the first predetermined frequency.

25. The method of claim 24, said base station further comprising a transmitter containing a first controllable transmitter frequency source and a second controllable transmitter frequency source, said method comprising the steps of:

encoding outbound information;

transmitting the outbound information to the mobile station at a third time on a third predetermined frequency associated with the first transmitter frequency source and at a fourth time on a fourth predetermined frequency associated with the second transmitter frequency source;

receiving second error statistics regarding errors detected in said transmitting step;

storing the second error statistics; and when the second error statistics exceed a predetermined threshold, modifying the third predetermined frequency.

26. A method of communicating over a cellular network between a mobile station and a base station having a transmitter containing a first controllable transmitter frequency source and a second controllable transmitter frequency source, and a processor, said method comprising the steps of:

encoding outbound information;

transmitting the outbound information to the mobile station on a first predetermine frequency associated with the first transmitter frequency source and a second predetermined frequency associated with the second transmitter frequency source;

receiving error statistics regarding errors detected in said transmitting step;

storing the error statistics; and when the error statistics exceed a predetermined threshold, modifying the first predetermined frequency.

* * * * *